United States Patent
Kao

(10) Patent No.: US 7,639,748 B2
(45) Date of Patent: Dec. 29, 2009

(54) METHOD AND CIRCUIT FOR FINE TIMING SYNCHRONIZATION IN THE ORTHOGONAL FREQUENCY DIVISION MULTIPLEXING BASEBAND RECEIVER FOR IEEE 802.11A/G WIRELESS LAN STANDARD

(75) Inventor: Kai-Pon Kao, Hsinchu (TW)

(73) Assignee: Via Technologies, Inc., Taipei (TW)

( * ) Notice: Subject to any disclaimer, the term of this patent is extended or adjusted under 35 U.S.C. 154(b) by 871 days.

(21) Appl. No.: 11/215,216

(22) Filed: Aug. 30, 2005

(65) Prior Publication Data

US 2007/0047433 A1    Mar. 1, 2007

(51) Int. Cl.
*H04K 1/10* (2006.01)
(52) U.S. Cl. .................. 375/260; 370/203; 370/204; 370/208; 370/210; 370/343; 455/103; 455/126; 455/501; 455/522; 455/561
(58) Field of Classification Search .................. 370/208
See application file for complete search history.

(56) References Cited

U.S. PATENT DOCUMENTS 7,280,605 B2 * 10/2007 Cha .......................... 375/260
7,298,772 B1 * 11/2007 Neerudu et al. .............. 375/136
7,415,059 B2 * 8/2008 Chadha et al. .............. 375/343
2004/0170197 A1 * 9/2004 Mehta ........................ 370/504

* cited by examiner

*Primary Examiner*—Shuwang Liu
*Assistant Examiner*—Dhaval Patel
(74) *Attorney, Agent, or Firm*—Thomas, Kayden, Horstemeyer & Risley

(57) ABSTRACT

A method for fine timing synchronization is provided. The method comprises: detecting an end point of the short preamble; delivering the samples after the end point to a matched filter to generate a plurality of correlation peaks; searching the correlation peaks generated from the samples of the first LTS for a first maximal peak point which is the correlation peak with a first maximal intensity, and obtaining the first time index of the first maximal peak point; searching the correlation peaks generated from the samples of the first LTS for a pre-peak point which is the correlation peak forming a peak intensity appearing before and nearest to the first maximal peak point, and obtaining the second time index of the pre-peak point; estimating a third time index of the start point of the second LTS according to the first and second time indexes.

16 Claims, 10 Drawing Sheets

METHOD AND CIRCUIT FOR FINE TIMING SYNCHRONIZATION IN THE ORTHOGONAL FREQUENCY DIVISION MULTIPLEXING BASEBAND RECEIVER FOR IEEE 802.11A/G WIRELESS LAN STANDARD

BACKGROUND

The present invention relates to the a baseband processor of the orthogonal frequency division multiplexing (OFDM) receiver, and more particularly, to an OFDM baseband processor for the wireless LAN (WLAN) IEEE 802.11a or IEEE 802.11g standards.

Orthogonal frequency division multiplexing (OFDM) is a modulation technique for wireless LAN standards such as IEEE 802.11a or 802.11g. OFDM distributes the data over a large number of carriers (or sub-carriers) that are spaced apart at precise frequencies. This spacing provides the "orthogonality" that prevents the demodulators from seeing frequencies other than their own. Because the data is split for transmission on several sub-carriers, the duration of every transmitted symbol on each sub-carrier is increased, and the amount of crosstalk between symbols or inter-symbol interference (ISI) is reduced. This is the reason why OFDM is so popular among applications for high bit rate communication systems nowadays.

In the IEEE 802.11a standard, the carrier frequency is 5 GHz. There are 64 implied subcarrier frequencies with a spacing of 312.5 kHz(=20 MHz/64, wherein 20 MHz is the channel bandwidth). Among the 64 implied subcarriers, there are 52 nonzero subcarriers, which includes 48 data subcarriers carrying data and four pilot subcarriers used as pilot tones. Each subcarrier hums away at 312.5k symbols/second. Data is blocked into 3.2-microsecond frames with an additional 0.8 microsecond of cyclic prefix tacked on for mitigation of intersymbol interference, and the data frame and the cyclic prefix thereof forms a data symbol lasting for 4 μs. A 64-point fast Fourier transform is performed over 3.2 microseconds to extract the 48 data symbols on the 48 QAM signals. For binary phase-shift keying (BPSK), with 1 bit per symbol, that is 48 bits in 4 microseconds, for an aggregate data rate of 12 Mbits/s. Half-rate convolutional coding brings the net rate down to 6 Mbits/s. For 64 QAM, the aggregate data rate is six times higher, or 72 Mbits/s.

FIG. 1 illustrates the main function blocks of the transmitter end 100 of the OFDM baseband processor according to the IEEE 802.11a standard. The main function blocks of the transmitter end include a signal mapper 102, a serial to parallel converter 104, an inverse fast Fourier transform (IFFT) block 106, a parallel to serial converter 108, a cyclic prefix (CP) adding block 110, a digital to analog converter (DAC) 112, and a radio frequency (RF) transmitter 114. OFDM is a multi-carrier modulation technique. First, the data stream is modulated with signal mapper 102 using modulation techniques such as Quadrature Amplitude Modulation (QAM) or Binary Phase Shift keying (BPSK). The next step in OFDM modulation is to convert the serial data into parallel data streams with the serial to parallel converter 104. The Inverse Fast Fourier transform (IFFT) is performed on the modulated data with the IFFT block 106. The IFFT is at the heart of the OFDM modulation, as it provides a simple way to modulate data streams onto orthogonal subcarriers. The data streams before and after IFFT are designated as X[n] and x[n] to represent frequency domain data and time domain data respectively, wherein n represents the order number of the subcarriers. After the IFFT, the parallel data streams are concatenated into a single data stream by the parallel to serial converter 108. Finally a characteristic cyclic prefix (CP) is added to each OFDM symbol being transmitted in the single data stream with the cyclic prefix adding block 110. The OFDM symbol is now ready, and after conversion from digital to analog form by the DAC 112 and modulation by the RF transmitter with a carrier frequency fc, the symbol is sent over the channel 150 as RF signals to the receiver end.

FIG. 2 illustrates the main function blocks of receiver end 200 of the OFDM baseband processor according to the IEEE 802.11a standard. The main function blocks of the receiver end 200 include a RF receiver 202, a sampler 204, a synchronization block 206, a cyclic prefix remover 208, a serial to parallel converter 210, a fast Fourier transform (FFT) block 212, a channel estimation and equalization block 214, a parallel to serial converter 216, and a signal demapper 218. The receiver end 200 performs the inverse of the transmitter end 100. After transmitting through channel 150, the signal is received by the RF receiver 202 with carrier frequency fc'. The received signal is then passed to the sampler 204 and sampled. Then, the data samples are compensated for carrier frequency offset (CFO) with the CFO correction block 226 inside the synchronization block. 206 wherein the CFO is caused by the difference between carrier frequency of transmitter end 100 and receiver end 200 (fc and fc'). The other function blocks inside the synchronization block 206 are frame detection block 220 and timing synchronization block 224. Frame detection is for detecting the symbol frame of the data samples, and timing synchronization is to detect the symbol boundary of the data samples inside a data frame. The receiver end 200 must determine the symbol boundary to assure that only the signal part of every OFDM symbol is written into the FFT and no part of the cyclic prefix. Implementing timing synchronization can also avoid Inter Symbol Interference (ISI) caused from sampling timing error. After the cyclic prefix of symbols are removed with the CP removal block 208, the data samples are converted form serial to parallel, and applied to the FFT block 212. The Fast Fourier Transform (FFT) converts the time domain samples back into a frequency domain. Because the signal through channel 150 has suffered from frequency selective attenuation, the data samples are passed to the channel estimation and equalization block 214 to equalize the attenuation. The parallel to serial converter block 216 converts the parallel data samples into a serial data stream. Finally, the data stream is demodulated with QAM or BPSK scheme by signal demapper 218 to recover the original input data.

FIG. 3 shows the OFDM burst mode frame structure 300 which actually has four distinct regions. The first is the short preamble 302. This is followed by a long-preamble 304 and, finally, by the signal symbol 306 and data symbols 308. Guard intervals 312, 314, 316 and 318 are inserted between each burst section. The short preamble 302 consists of 10 identical short OFDM training symbols 322, and each short training symbol 322 lasts for 0.8 μs and contains 16 data samples. The long preamble 304 consists of two identical long training symbols (LTS) 324 and 326, and each long training symbol lasts for 3.2 μs and contains 64 data samples. Between the short and long OFDM symbols, there is a guard interval (GI2) 312 of length 1.6 μs (32 data samples) that constitutes the cyclic prefix of the long symbols. Short training symbol 302 is used for frame detection, coarse timing synchronization, and carrier frequency offset (CFO) estimation. Long training symbols 324 and 326 are used for fine timing synchronization and channel estimation. Signal symbol 328 contains information about data rate, data length, and modulation scheme. Data symbols 330 and 332 contain the payload data and are of variable length.

The traditional method to implement fine timing synchronization in timing synchronization block 224 shown in FIG. 2 uses both long training symbols. Received long preamble 304 consists of guarding interval 312, first received long training symbol 324 and second received long training symbol 326, each of which contains 32, 64, 64 data samples respectively. The traditional method averages the data samples of the two received long training symbols 324 and 326 for noise reduction. Then the averaged data samples are fed into a matched filter, which correlates the averaged data samples with the conjugate of the ideal data samples of a long training symbol free from distortion of the transmission path. The output of the matched filter is calculated according to the following algorithm:

$$MF(n) = \sum_{i=1}^{64} RLTS(n+i) \times \overline{LTS(i)},$$

wherein MF(n) indicates the output value of the matched filter, n represents sample index, RLTS indicates the averaged data samples of the first received long training symbol 324 and the second received long training symbol 326, and LTS indicates the ideal data samples of a long training symbol. There should be a peak value among the output of the matched filter, and the time index of the sample generating the peak value corresponding to the midpoint of the long training symbol. Thus the boundary of the received long training symbol can be inferred according to its midpoint and the sampling process can then be revised according to the symbol boundary to avoid inter-symbol interference.

However, because the traditional method for fine timing synchronization uses both received long training symbols in the averaging process to calculate the input of matched filter, it causes latency for performing the following processes such as FFT. Moreover, the determination of the peak output from the matched filter is often seriously interfered by pre-peak that appears before the main peak, so the midpoint of the symbol determined from the main peak is often imprecise.

SUMMARY

Therefore the present invention provides a method and circuit for fine timing synchronization in an orthogonal frequency division multiplexing (OFDM) baseband receiver for IEEE 802.11a or 802.11g wireless local area network (LAN) standards.

Before the method and the synchronization circuit is implemented, a received signal of the OFDM baseband receiver is sampled into a plurality of samples. The received signal comprises a short preamble, a long preamble, a signal symbol, and a plurality of data symbols, wherein the long preamble is composed of a guarding interval and a first and second long training symbol (LTS).

A method for fine timing synchronization is provided. An exemplary embodiment of a method comprises the following steps. First, an end point of the short preamble is detected. The samples after the end point are delivered to a matched filter which correlates the samples with an impulse response of an ideal long training symbol to generate a plurality of correlation peaks. The correlation peaks generated from the samples of the first LTS are then searched for a first maximal peak point which is the correlation peak with a first maximal intensity, to obtain the first time index of the first maximal peak point. The correlation peaks generated from the samples of the first LTS are then searched for a pre-peak point which is the correlation peak forming a peak intensity appearing before and nearest to the first maximal peak point, to obtain the second time index of the pre-peak point. A third time index of the start point of the second LTS is then estimated according to the first and second time indexes, wherein the samples since the third time index is fed to a fast Fourier transform (FFT) block to perform FFT for channel estimation, so as to achieve fine timing synchronization.

A synchronization circuit for fine timing synchronization is also provided. An exemplary embodiment of a synchronization circuit comprises a matched filter, for correlating the samples with an impulse response of an ideal long training symbol to generate a plurality of correlation peaks. The synchronization circuit also comprises an enable circuit, for generating a first trigger signal when detecting an end point of the short preamble. The synchronization circuit also comprises a peak search circuit, coupled to the enable circuit and the matched filter, for searching the correlation peaks generated from the samples of the first LTS for a first maximal peak point which is the correlation peak with a first maximal intensity and obtaining the first time index of the first maximal peak point once receiving the first trigger signal, and generating an second trigger signal at the first peak time index.

The synchronization circuit also comprises: a shift register, coupled to the matched filter, for storing the correlation peaks before the first maximal peak point; a pre-peak search circuit, coupled to the shift register and the peak search circuit, for searching the correlation peaks stored in the shift register for a pre-peak point which is the correlation peak forming a peak intensity appearing before and nearest to the first maximal peak point, to obtain a second time index of the pre-peak point once receiving the second trigger signal; a symbol timing calculator, coupled to the peak search circuit and the pre-peak search circuit, for estimating a third time index of the start point of the second LTS according to the first and second time indexes, wherein a fast Fourier transformation (FFT) of the samples can be initiated at the third time index to achieve fine timing synchronization.

DESCRIPTION OF THE DRAWINGS

The invention can be more fully understood by reading the subsequent detailed description in conjunction with the examples and references made to the accompanying drawings, wherein.

DETAILED DESCRIPTION

Figure 4:
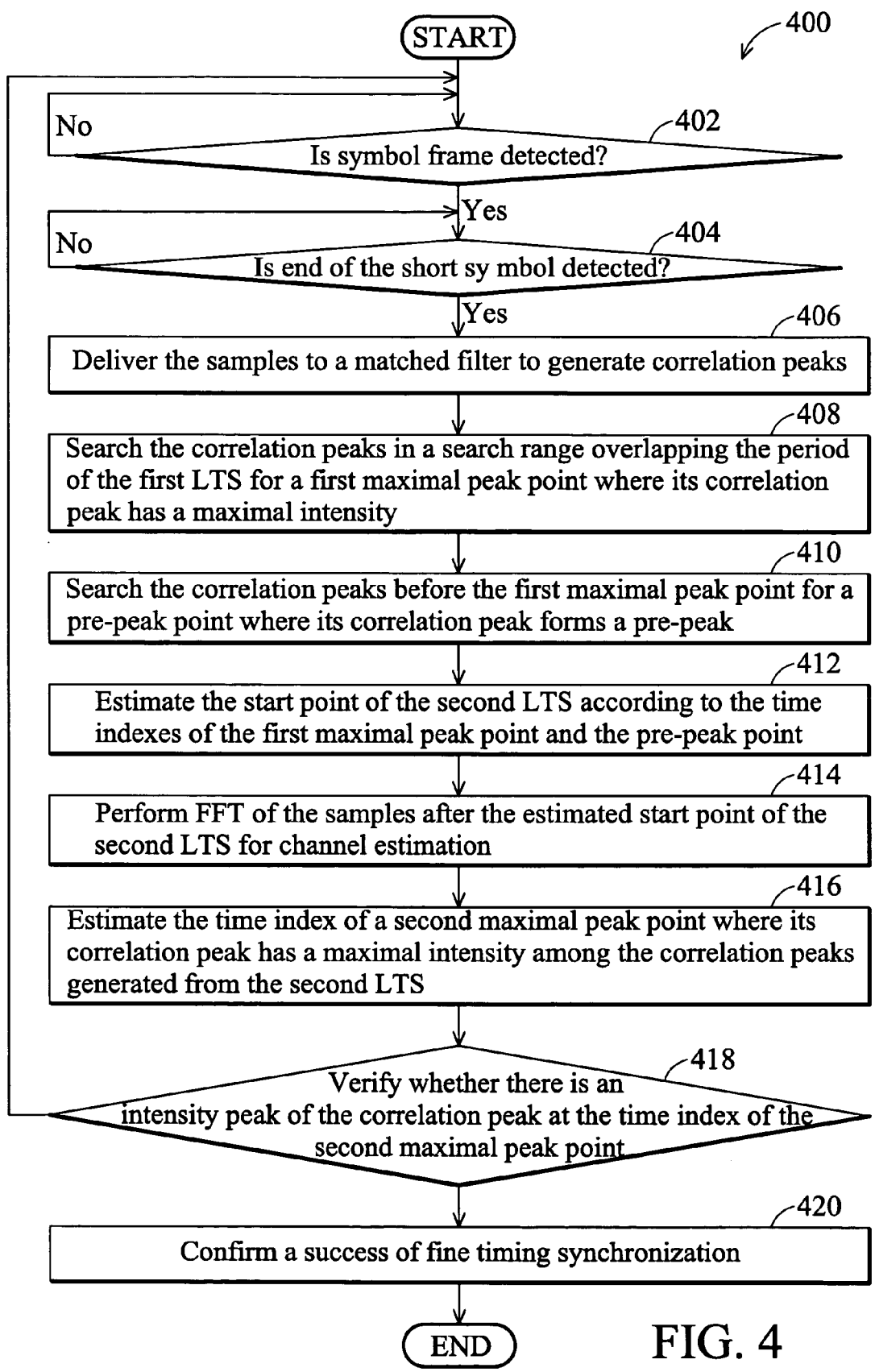
FIG. 4 is a flowchart illustrating an embodiment of a method for fine timing synchronization.

FIG. 4 is a flowchart illustrating a method 400 for fine timing synchronization. The method 400 begins with step 402, which executes frame detection to verify whether the samples received from sampler include an OFDM symbol. If the step 402 verification is successful, step 404 attempts to detect the end of the short preamble in the samples. If so, the samples received thereafter belong to the long preamble. Then, these samples are delivered to a matched filter at step 406 to generate a series of correlation peak signals. In the matched filter, the received samples are correlated with an ideal OFDM training signal. The resulting matched filter output signal comprises correlation peaks from which timing information can be derived. Then, step 408 searches for a first maximal peak point where the intensity of the correlation peaks output from the matched filter is maximal within a search range where the correlation peaks are approximately computed from the first long training symbol (LTS), and identifies the time index corresponding to the maximal peak point as the first time index. Then, step 410 searches for a pre-peak point where the intensity of the correlation peak forms a pre-peak occurring before and nearest to the maximal peak point, and identifies the time index corresponding to the pre-peak point as the second time index.

After step 408 and 410, step 412 estimates the third time index of the start point of the second long training symbol (LTS) according to the first time index and the second time index. Because the start point of the second LTS can be determined now, the samples belonging to the second LTS can be distinguished and those samples can be fed into the fast Fourier transform block to execute FFT for channel estimation at step 414. In order to ascertain that the forgoing steps have successfully achieved timing synchronization, we can estimate a fourth time index corresponding to a second maximal peak point where the intensity of correlation peaks output from the matched filter is the maximal within a range where the correlation peaks are computed from the second LTS according to the third time index at step 416. Then, step 418 verifies whether there is a peak value of the correlation peak at the fourth time index. If so, step 420 confirms timing synchronization success. The method 400 will be further described in the following.

Figure 1:
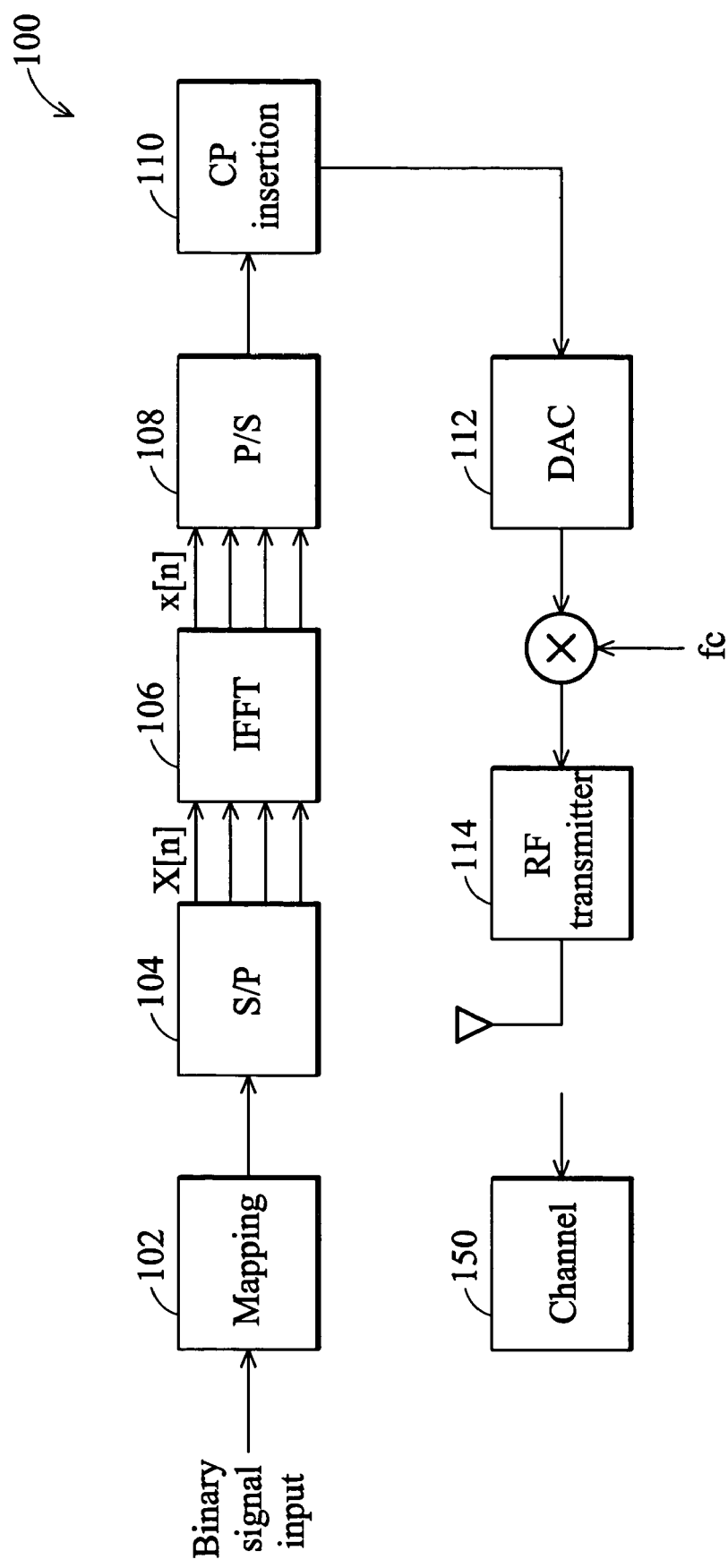
FIG. 1 illustrates the main function blocks of the transmitter end of the OFDM baseband processor according to the IEEE 802.11a standard.
Figure 2:
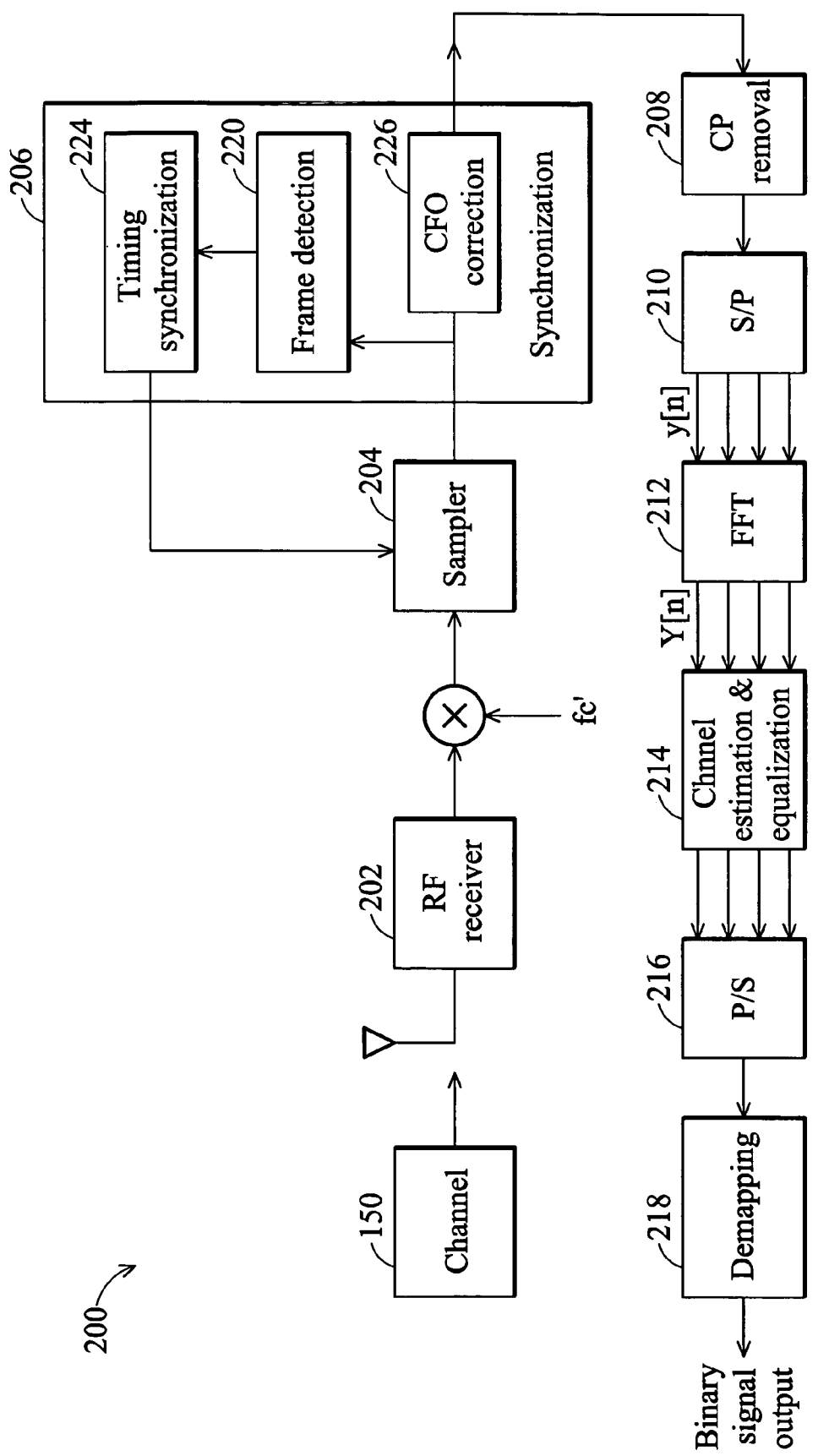
FIG. 2 illustrates the main function blocks of the receiver end of the OFDM baseband processor according to the IEEE 802.11a standard.
Figure 3:
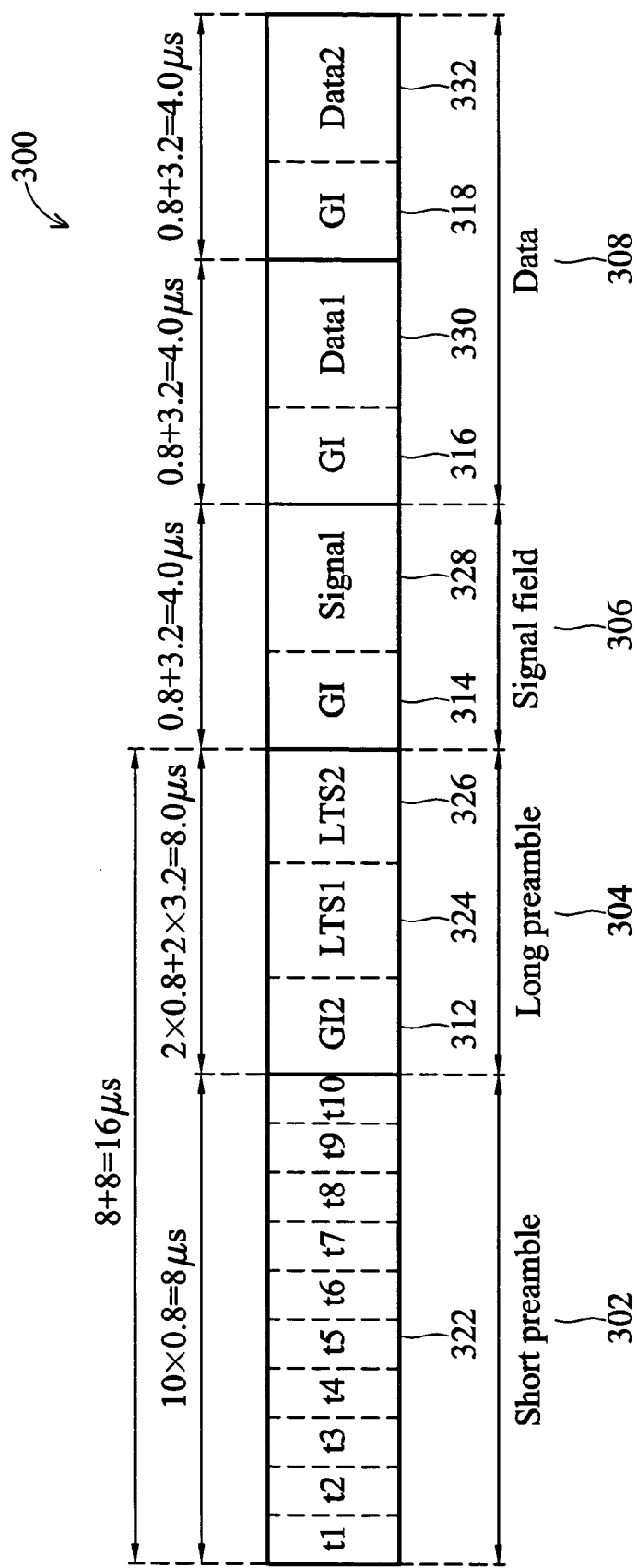
FIG. 3 shows the OFDM burst mode frame structure.
Figure 5:
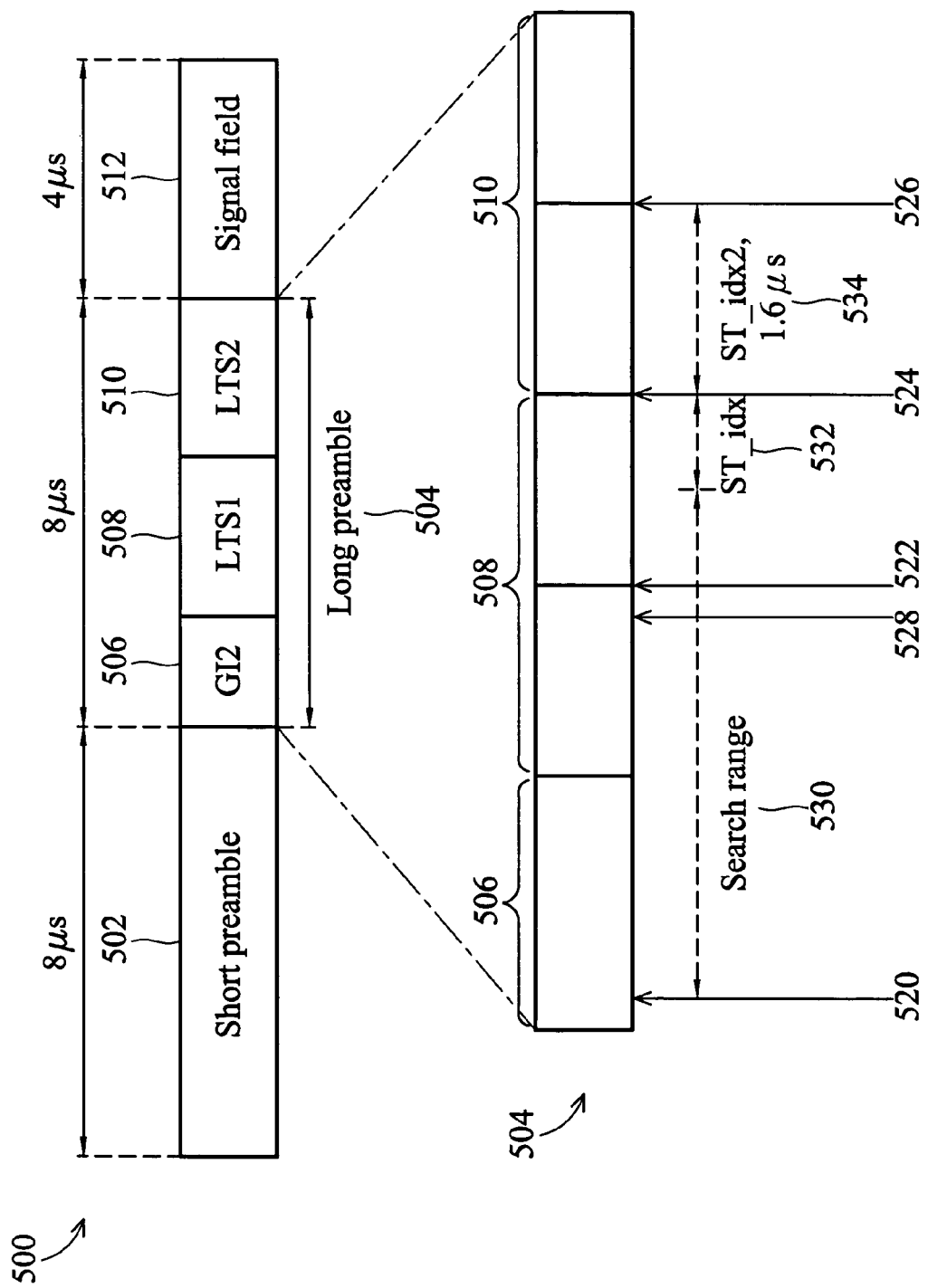
FIG. 5 is a schematic representation of an embodiment of a timing sequence for implementing the method shown in FIG. 4.

Referring now to FIG. 5, which is a schematic representation of timing sequence for implementing the method 400 for fine timing synchronization. The upper half of FIG. 5 illustrates a portion of the OFDM frame structure in FIG. 3 which includes a short preamble region 502, a long preamble region 504, and a signal field 512. The long preamble region 504 is composed of guard interval 506, first LTS 508 and second LTS 510, and is magnified to show in the bottom half of FIG. 5. Because the sampling rate is 20 MHz, the guard interval 506n (1.6 µs), the first LTS 508 (3.2 µs) and the second LTS 510 (3.2 µs) contain 32, 64, and 64 samples, respectively. The magnified long preamble 504 is sliced into 5 sub-regions of equal length 1.6 µs. Time index 520 marks the detection point of the end of the short preamble in step 406 of FIG. 4. Time index 522 (the first time index in method 400) marks the first maximal peak point in the step 408 of FIG. 4, and is approximately the midpoint of the first LTS. Time index 528 (the second time index in method 400) is near but before the time index 522 and marks the pre-peak point in step 410 of FIG. 4. Time index 524 (the third time index in method 400) marks the start point of the second LTS in the step 412 of FIG. 4. Time index 526 (the fourth time index in method 400) marks the second maximal peak point in the step 416 of FIG. 4, and is approximately the midpoint of the second LTS. Search range 530 is the predetermined interval for step 408 to search for the first maximal peak point and overlaps the greater portion of the existing period of the first LTS. Search range 530 extends from time index 520 to a probable end where the maximal peak point should have passed. ST_idx 532 is the interval between the end of search range 530 and time index 520. ST_idx2 534 marks the interval between time index 524 and time index 526, and its length is 1.6 µs which equals to 32 sampling periods. Search range 530, ST_idx 532, and ST_idx2 534 will be referenced in FIG. 9. All the time intervals (for examples: 530, 532, and 534) or time indexes are measured with the unit of sampling period (Ts=0.05 µs), which is the time difference between two consecutive samples.

Figure 6:
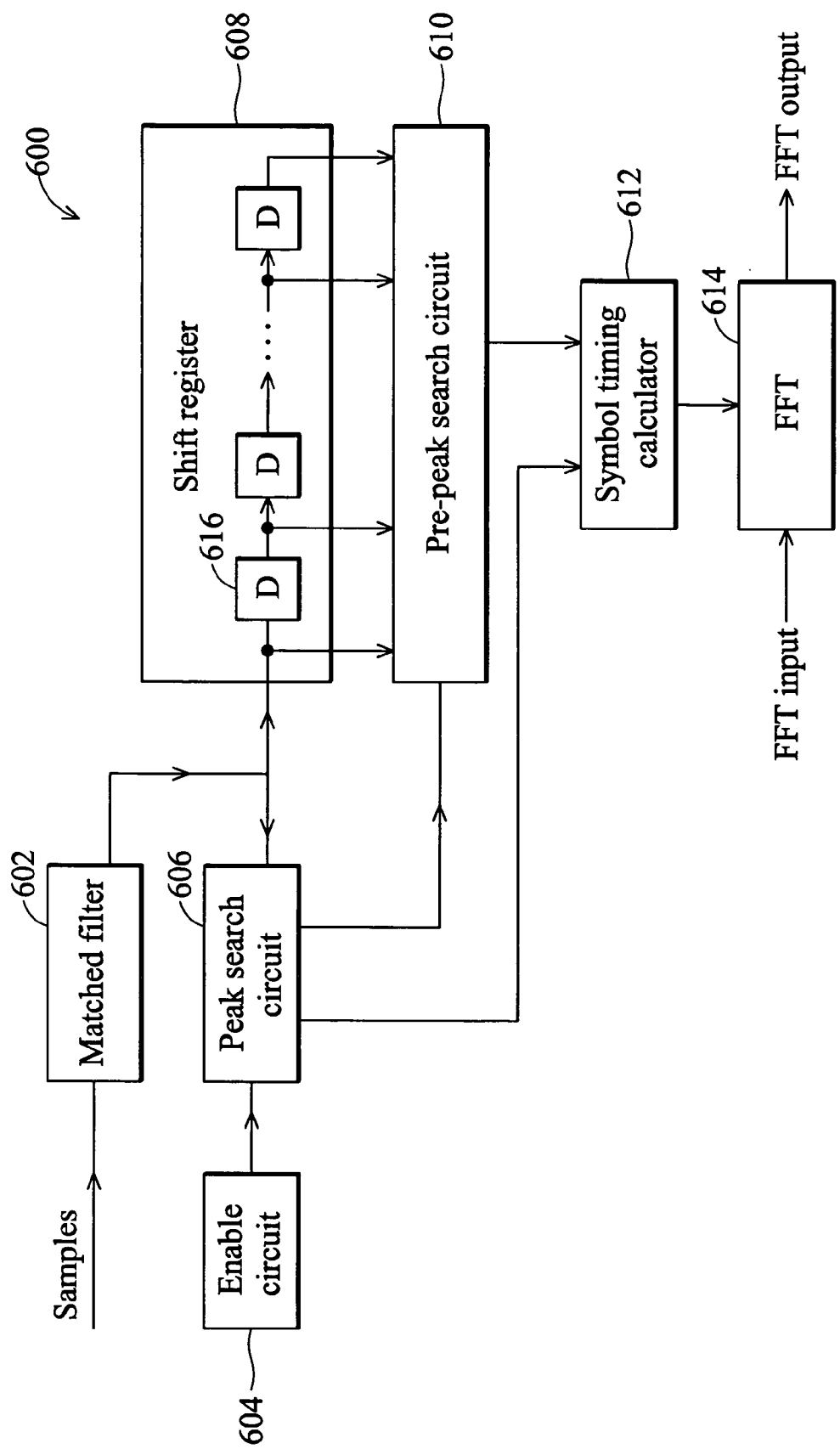
FIG. 6 is a simple block diagram of an embodiment of a synchronize circuit for implementing the method shown in FIG. 4.

Referring now to FIG. 6, which is a simple block diagram of synchronize circuit 600 for implementing the method 400 for fine timing synchronization. The samples are first delivered to a matched filter 602, where the samples are correlated with the ideal OFDM LTS, producing an output signal comprising correlation peaks. The matched filter 602 will be further described in connection to FIG. 8.

Figure 7:
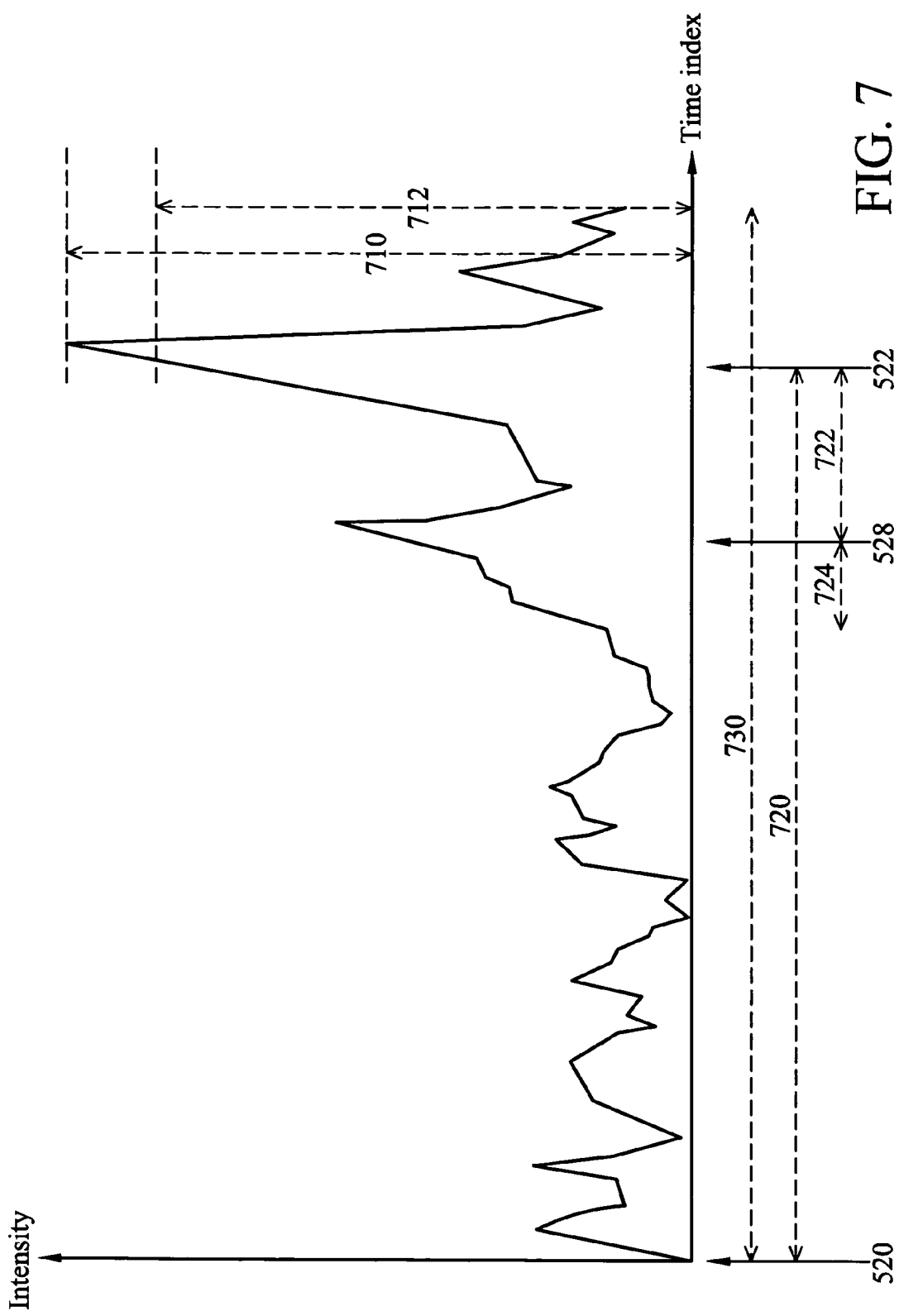
FIG. 7 shows the correlation peaks output from an embodiment of a matched filter shown in FIG. 6.

FIG. 7 shows the correlation peaks output from the matched filter 602. The vertical axis shows the intensity of the correlation peaks, and the horizontal axis shows the time index. The unit of the horizontal axis in FIG. 7 is the sampling period (Ts=0.05 µs) of the sampler in the receiver end, which is the time difference between two consecutive samples. The time indexes of the correlation peaks shown in FIG. 7 are only within the search range 530 of FIG. 5. The search range 530 starts from time index 520 which marks the detection point of the end of the short preamble. The correlation peak with the maximal intensity within search range 530 is the first maximal peak point, and its time index is time index 522 of FIG. 5. The maximal peak intensity 710 is the intensity of the first maximal peak point, and the peak threshold 712 is a predetermined level of intensity to filter out the first maximal peak point. The correlation peak forming a pre-peak occurring before but nearest to the first maximal peak point within search range 530 is the pre-peak point, and its time index is time index 528 of FIG. 5. Time interval 720 is the interval between time index 520 and time index 522, and indicates the first maximal peak point with the origin of the detection point of the end of the short preamble. Time interval 722 is the interval between time index 528 and 522, and indicates the pre-peak point with the origin of the first maximal peak point. Cyclic prefix shift interval 724 is the shift interval caused from cyclic prefix.

Now referring back to FIG. 6, the enable circuit 604 shown in FIG. 6 detects the end of the short preamble from the samples of the received signal. Once the end of the short preamble is detected, the enable circuit 604 creates a signal to trigger the peak search circuit 606. The peak search circuit 606 receives the correlation peaks from the matched filter 602, and searches the correlation peaks computed from the first LTS for the peak having the maximal intensity, which is the first maximal peak point in step 408 of method 400 in FIG. 4. Because the boundary of the first LTS cannot yet be determined from the samples, the search range 530 of FIG. 5 must be set in advance for delimiting the correlation peaks to be searched.

After the peak search circuit 606 finds the first maximal peak point, it generates a signal to trigger the pre-peak search circuit 610 to search for the pre-peak point in step 410 of method 400 in FIG. 4. The pre-peak search circuit 610 searches the correlation peaks before the first maximal peak point, and these correlation peaks are stored in a shift register 608. The pre-peak point is the correlation peak occurring nearest to the first maximal peak point and having an intensity less than the intensity of the first maximal peak.

After both the first maximal peak point and pre-peak point are found, we can identify the time indexes (i.e. time index 522 and 528 in FIG. 5) corresponding to these points. The symbol timing calculator 612 can then estimate the start point of the second LTS (i.e. time index 524 in FIG. 5) according to the time indexes of the first maximal peak point and the pre-peak point. The symbol timing calculator also includes an up-counter (not shown in FIG. 6) inside for counting the time index of the samples. Then the symbol timing calculator 612 can count until the estimated start point of the second LTS with the up-counter and generate a signal to initiate the FFT block 614 for performing the FFT of the second LTS for the following channel estimation process.

In order to ensure that the estimation of timing synchronization is accurate, some verification works must be performed. The symbol timing calculator 612 can estimate the correlation peak having the maximal intensity computed from the second LTS by the matched filter 602 according to the time indexes of the first maximal peak point and the pre-peak point, wherein the estimated correlation peak is the second maximal peak point in step 416 of method 400 in FIG. 4. By using the up-counter, the symbol timing calculator 612 can count until the estimated second maximal peak point. If the intensity of the correlation peak at the estimated second maximal peak point is near the maximal intensity of the correlation peaks computed from the second LTS by the matched filter 602, a success of the fine timing synchronization process can be confirmed, as in the step 420 of FIG. 4.

Figure 8:
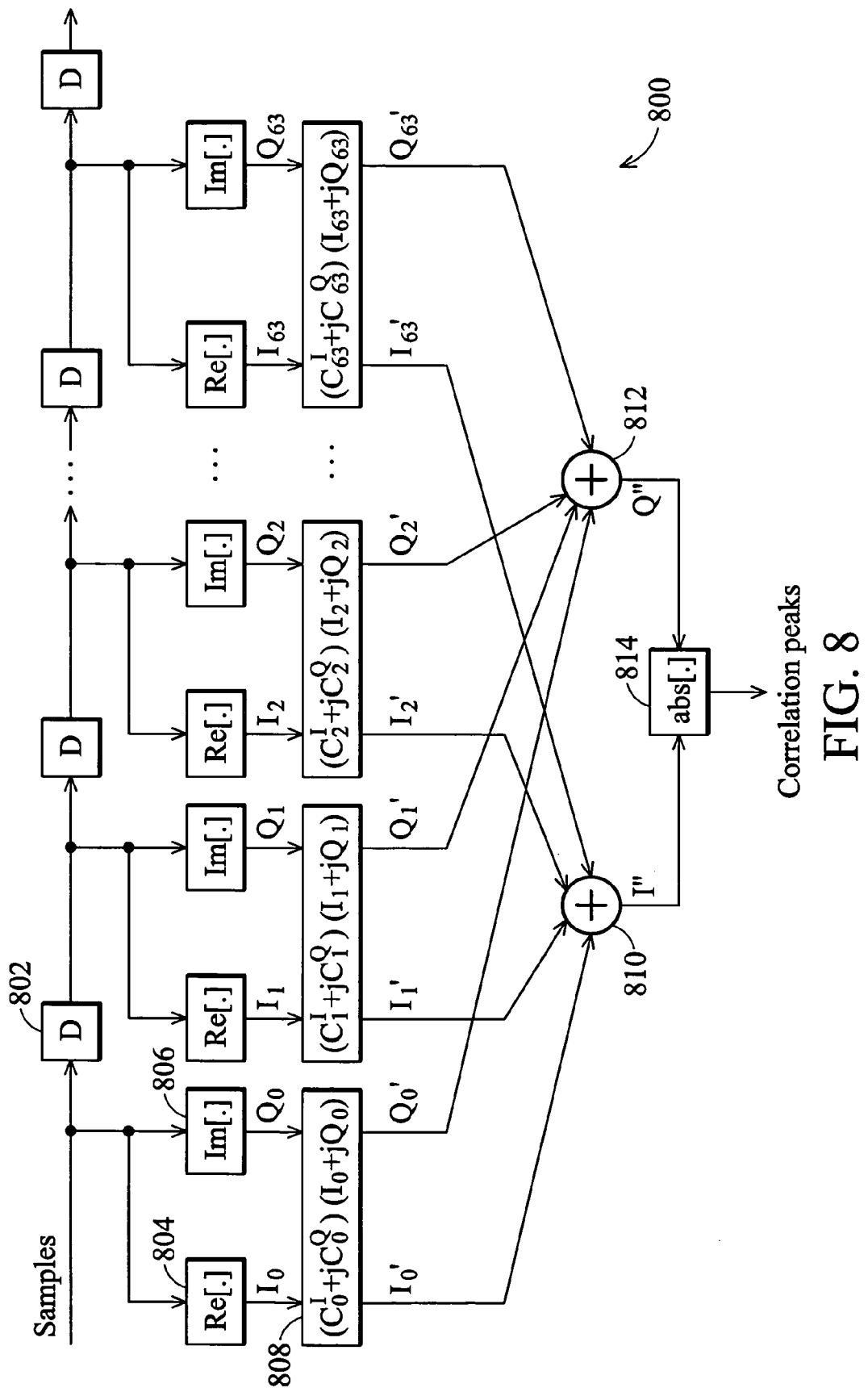
FIG. 8 is an embodiment of a matched filter.

Referring now to FIG. 8, shown therein is an embodiment of a matched filter 800. Matched filter 800 can be used to implement the matched filter 602 of FIG. 6. In the matched filter approach, the impulse response of the ideal long training symbol is stored in the matched filter 800 as coefficients. As samples enter the matched filter at the rate of $1/T_s$ ($T_s$=0.05 μs), the matched filter 800 outputs correlation peaks at the same rate so that, in the time span of one LTS (3.2 μs), the matched filter 800 will have output 64 correlation peaks. The process can be repeated for both first and second LTS.

The input samples first are fed to a series of delay blocks 802. Each delay block 802 holds the sample for Ts (0.5 μs) and then updates its content with the next samples. Because the length of an LTS is 3.2 μs, there are 64 samples in an LTS, so there are 64 delay blocks 802 in the matched filter 800. Block 804 retrieves the real part Ik of the samples from the delay block 802, and Block 806 retrieves the imaginary part Qk of the samples from the delay block 802, wherein the prefix k indicates the order of the delayed samples. Accordingly, there are 64 blocks 802 and blocks 804 corresponding to each delay block 802 to treat the delayed samples. Block 808 receives the real part Ik and the imaginary part Qk of the delayed samples and calculates a correlation product (Ik'+j Qk') which equals (Ik+j Qk) multiplied by ($Ck^I$+j $Ck^Q$), wherein Ik' and Qk' are the real and imaginary part of the correlation product respectively, $Ck^I$ and $Ck^Q$ are the real and imaginary part of the coefficients reflecting the impulse response of the ideal long training symbol, and prefix k indicates the order of the delayed samples. All of the real part Ik' of the correlation product are then gathered to an adder 810 and accumulated as I", and all of the imaginary part Qk' of the correlation product are gathered to an adder 812 and accumulated as Q". Finally, absolute block 814 computes the root-mean-square value of I" and Q" to produce a correlation peak as the output of the matched filter 800.

Figure 9A:
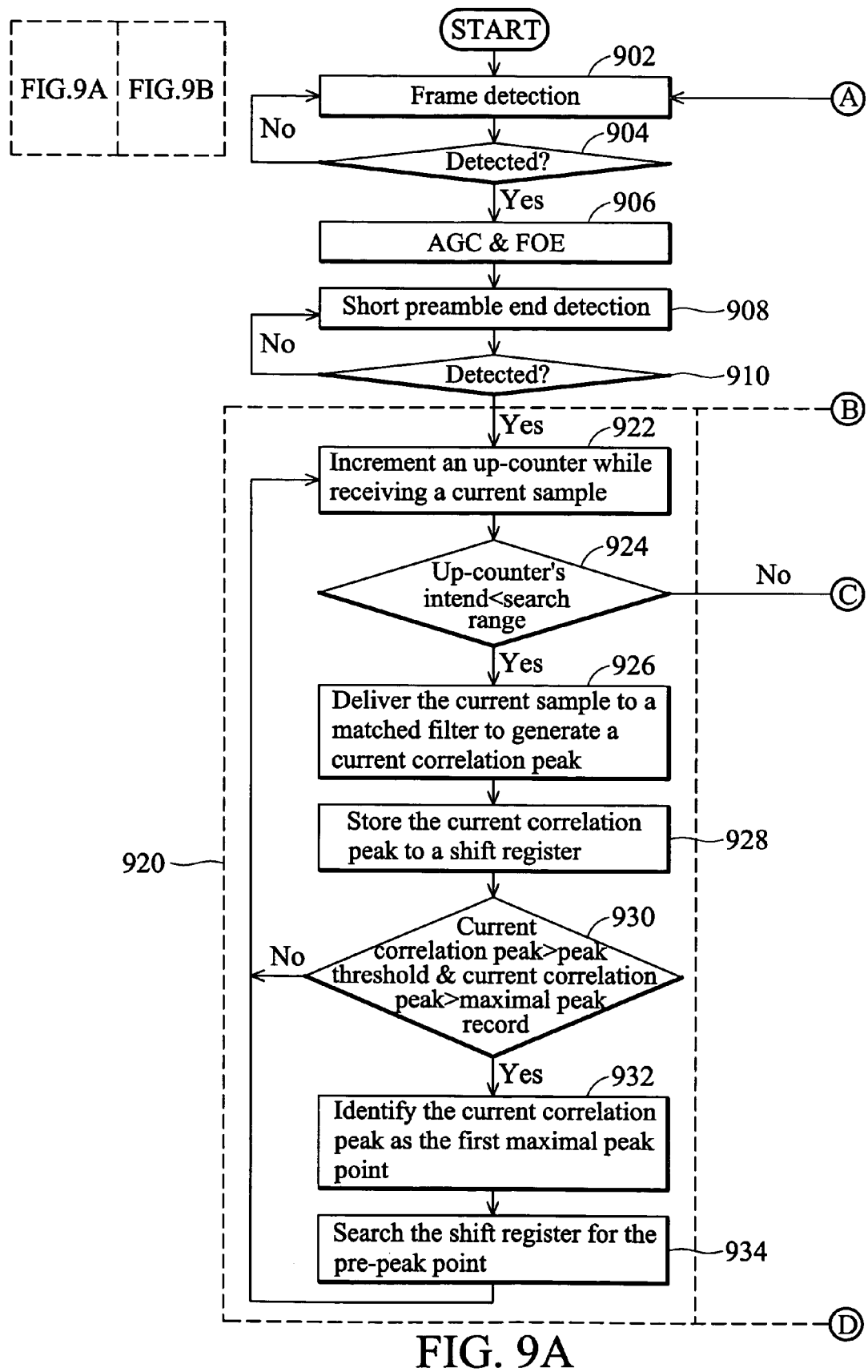
FIG. 9 is a flowchart of an embodiment of a method for fine timing synchronization.
Figure 9B:
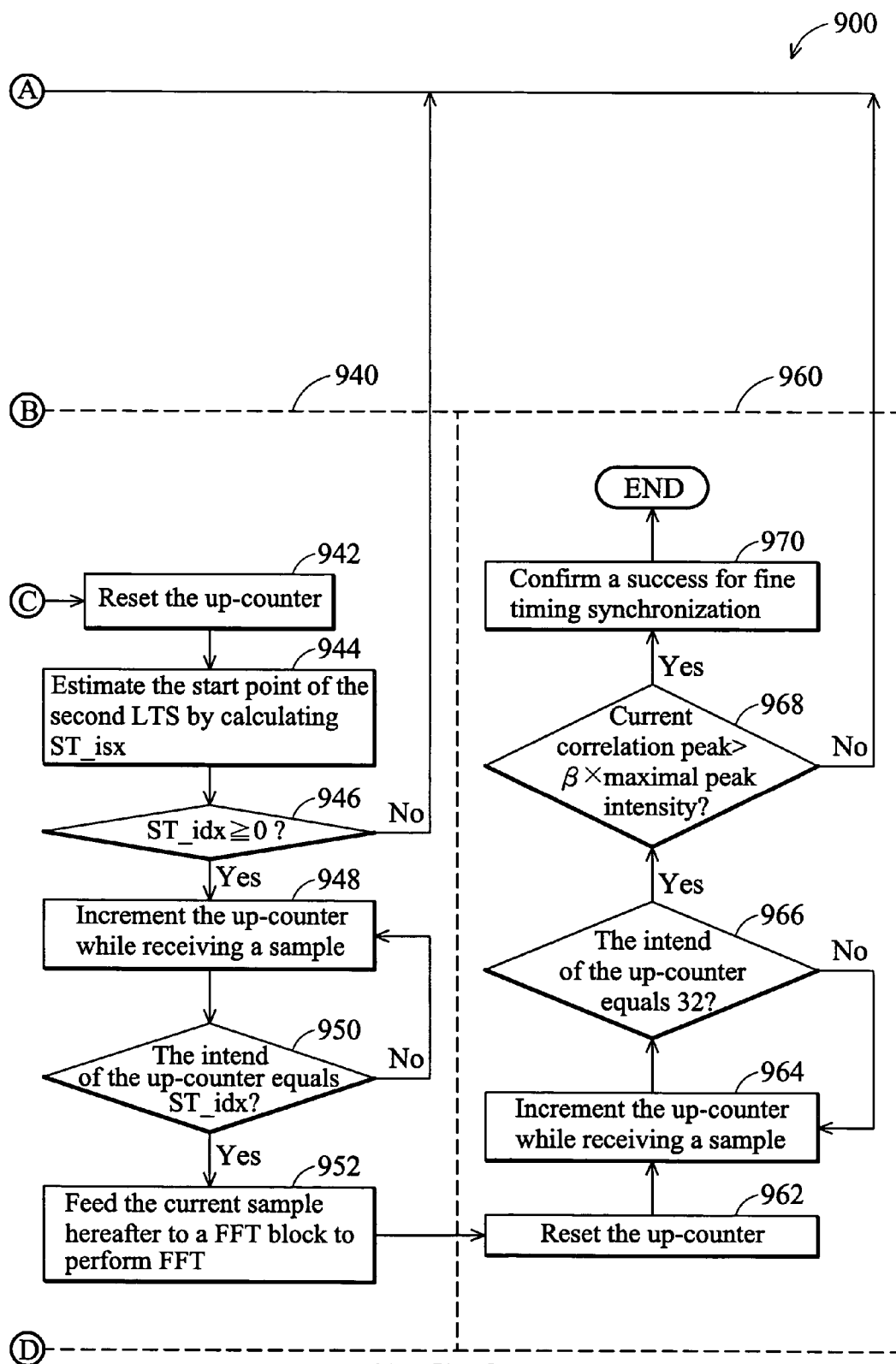

Referring now to FIG. 9, illustrated is a flowchart of another embodiment of method 400 shown in FIG. 4, herein designated by the reference 900. The method 900 is substantially similar to the method 400 shown in FIG. 4, but it uses the circuit 600 shown in FIG. 6 to implement the method 400, and it discloses more detailed features and algorithms to realize the method 400. The method 900 begins with step 902, which detects the existence of an OFDM symbol frame. At step 904, if the detection in step 902 is successful, step 906 processes the received samples with automatic gain control (AGC) and corrects the frequency offset of the samples with frequency offset estimation (FOE). Step 908 detects the end of the short preamble with the enable circuit 604 to trigger following process for fine timing synchronization with the first long training symbol (LTS). The following steps is classified into three processes including peak search process 920, timing calculation process 940, and verification process 960. These processes will be further described in the following.

Peak search process 920 searches for the first maximal peak point and the pre-peak point, and it is roughly similar to the steps 408 and 410 of method 400. The peak search process 920 includes steps 922, 924, 926, 928, 930, 932, and 934. First, at step 922, the symbol timing calculator 612 increments the up-counter everytime the circuit 600 receives a sample to record the time elapsed. Then at step 924 the symbol timing calculator 612 verifies whether the value of the up-counter is less than the value of the search range 530 in FIG. 7. If so, it means that the current sample still belongs to the search range of the first maximal peak point in the first LTS. Therefore the current sample is delivered to the matched filter 602 to generate a correlation peak at step 926, and the current correlation peak is stored into the shift register 608 at step 928. Then the peak search circuit 606 checks whether the intensity of the current correlation peak is larger than a peak threshold 710 at step 930. If so, the peak search circuit 606 continues to check whether the intensity of the current correlation peak is larger than a maximal peak record which has stored the correlation peak with maximal intensity until now. If so, the current correlation peak is the first maximal peak point. Therefore, the maximal peak record is updated with the intensity of the current correlation peak, and the peak search circuit 606 stores its time index as time index 522 at step 932 and generates a signal to trigger the pre-peak search circuit 610. Otherwise, the current correlation peak is not the first maximal peak point, and the circuit 600 continues to receive the next sample and execute step 922.

At step 934, the pre-peak search circuit 610 starts to search the shift register 608 for the pre-peak point. The pre-peak search circuit 610 attempts to find a correlation peak greater than the product of a constant a and the maximal peak intensity 710 from the latest sample in the shift register 608, mark the correlation peak as the pre-peak point, and identify its time index as the time index 528, wherein the constant a is a predetermined constant ranging between 0 and 1.

Timing calculation process 940 estimates the time index of the start point of the second long training symbol (LTS), and it is roughly similar to the steps 412 and 414 of method 400 The timing calculation process 940 includes steps 942, 944, 946, 948, 950, and 952. First, if the symbol timing calculator 612 finds the value of the up-counter larger than the search range 530 at step 924, it will reset the up-counter at step 942. Because both the time indexes of the first maximal peak point and the pre-peak point are known in step 932 and step 934, the symbol timing calculator 612 can estimate the time index of the start point of the second LTS according to the following algorithm:

$ST\_idx=32-(Search\_Range-peak\_idx)-(pre-peak\_idx+st\_shift)$,

ST_idx is the ST_idx 532 shown in FIG. 5 and indicates the interval between the end of search range 530 and the start point of the second LTS; Search_Range is the interval of search range 530 which is a predetermined value; peak_idx is the time interval 720 shown in FIG. 7 and can be obtained according to the first maximal peak point in the step 932; pre_peak_idx is the time interval 722 shown in FIG. 7, and can be obtained according to the pre-peak point in the step 934; st_shift is the Cyclic prefix shift interval 724 shown in FIG. 7.

If the ST_idx is positive at step 946, the symbol timing calculator 612 continues to increment the up-counter at step 948 every time the circuit 600 receives a sample. If the value of the up-counter equals ST_idx at step 950, the current sample is the estimated start point of the second LTS. Then the symbol timing calculator 612 can generate a signal to trigger the FFT block 614 to execute the fast Fourier transform of the current sample at step 952.

Verification process 960 verifies whether the fine timing synchronization is successful, and is roughly similar to the steps 416, 418, and 420 of method 400. The verification process 960 includes steps 962, 964, 966, and 968. First, the symbol timing calculator 612 resets the up-counter at the estimated start point of the second LTS at step 962. The symbol timing calculator 612 continues to increment the up-counter at step 964 every time the circuit 600 receives a sample. Because ST_idx2 534 represents the interval between the estimated start point of the second LTS and the estimated second maximal peak point, and its length is 1.6 µs which is equal to 32 sampling periods, the symbol timing calculator 612 can derive the time index 526 of the second maximal peak point according to the time index 524 of the estimated start point of the second LTS. Thus, if the value of the up-counter is equal to 32 at step 966, the circuit 600 checks the intensity of the current correlation peak at step 968. If the intensity of the current correlation peak is larger than the product of a constant β and the maximal peak intensity 710 at step 968, the circuit 600 can generate a signal to confirm the success of our fine timing synchronization at step 970, wherein the constant β is a predetermined constant ranging between 0 and 1.

The invention relates to the fine timing synchronization for IEEE 802.11a/g OFDM system. It uses the correlation peaks generated from the matched filter with the long preamble to find the peak and pre-peak point, and then obtains the actual time index of both. Only the first long training symbol is used to obtain the time index of these peak points, and the second long training symbol is then used to verify the accuracy of the whole synchronization process. Because the invention uses only the first long training symbol to achieve fine timing synchronization, it can avoid the latency problem of using both the first and second LTS in the traditional fine timing synchronization process. Moreover, the invention uses a pre-peak search algorithm, thereby solving the serious problem of the inter-symbol interference (ISI) caused by pre-peak.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for fine timing synchronization in an orthogonal frequency division multiplexing (OFDM) baseband receiver for IEEE 802.11a or 802.11g wireless local area network (LAN) standards, wherein a received signal of the OFDM baseband receiver has been sampled into a plurality of samples, and the received signal comprises a short preamble, a long preamble, a signal symbol, and a plurality of data symbols, wherein the long preamble is composed of a guard interval and a first long training symbol (LTS) and a second long training symbol (LTS), the method comprising the steps of:

detecting an end point of the short preamble;

delivering the samples after the end point to a matched filter which correlates the samples with an impulse response of an ideal long training symbol to generate a plurality of correlation peaks;

searching the correlation peaks generated from the samples of the first long training symbol for a first maximal peak point where its correlation peak has a first maximal intensity, and obtaining a first time index of the first maximal peak point;

storing the correlation peaks which are generated from the samples of the first long training symbol and occur before the first maximal peak point into a shift register;

searching the correlation peaks stored in the shift register for a pre-peak point where its correlation peak forms a pre-peak appearing before and nearest from the first maximal peak point, and obtaining a second time index of the pre-peak point; and estimating a third time index of a start point of the second long training symbol according to the first and second time indexes;

wherein the samples since the third time index are fed to a fast Fourier transform (FFT) block to perform FFT for channel estimation, so as to achieve fine timing synchronization.

2. The method according to claim 1, further comprising the steps of:

estimating a fourth time index of a second maximal peak point where its correlation peak has a second maximal intensity among the correlation peaks generated from the samples of the second long training symbol according to the third time index; and verifying whether an intensity of a correlation peak at the fourth time index approximates the second maximal intensity among the correlation peaks generated from the samples of the second long training symbol to confirm a success of the fine timing synchronization.

3. The method according to claim 1, wherein the matched filter is used for implementing the following steps:

multiplying the samples delayed for a delay period of 1 to 64 sampling periods and a plurality of matched filter coefficient corresponding to the delay period to generate a plurality of correlation products, wherein the plurality of matched filter coefficient reflects the impulse response of the ideal long training symbol; and accumulating all of the plurality of correlation products to generate a correlation peak.

4. The method according to claim 1, wherein the step of searching for the first maximal peak point comprises the steps of:

resetting an up-counter once detecting the end point of the short preamble;

incrementing the up-counter when receiving a current sample;

verifying whether the up-counter is less than a search range which delimits the correlation peaks to be searched;

delivering the current sample to the matched filter to generate a current correlation peak; and identifying the current correlation peak as the first maximal peak point if a intensity of the current correlation peak is larger than a predetermined peak threshold and larger than a maximal peak record storing a maximal intensity of the correlation peaks before the current correlation peaks.

5. The method according to claim 4, wherein the third time index is estimated according to the following algorithm:

ST_idx=32−(Search_range−peak_idx)−(prepeak_idx+ st_shift);

wherein

ST_idx is the third time index of the start point of the second long training symbol with the origin at a time index of an end of the search range and, Search_range is a time interval of the search range which starts from the end point of the short preamble, peak_idx is a time interval between the end point of the short preamble and the first time index of the first maximal peak point, prepeak_idx is a time interval between the second time index of the pre-peak point and the first time index of the first maximal peak point, and St_shift is a shift interval.

6. The method according to claim 2, wherein the step of estimating the fourth time index is by adding 32 sampling periods to the third time index to obtain the fourth time index.

7. The method according to claim 2, wherein the verifying step comprises the steps of:

resetting an up-counter at the start point of the second long training symbol;

incrementing the up-counter when receiving a current sample; and confirming success of fine timing synchronization if an intensity of a current correlation peak is larger than a product of a predetermined constant between 0 and 1 and the first maximal intensity, wherein the current correlation peak generated from a sample received when the up-counter is at 32.

8. A synchronization circuit for fine timing synchronization in an orthogonal frequency division multiplexing (OFDM) baseband receiver for IEEE 802.11a or 802.11g wireless local area network (LAN) standards, wherein a received signal of the OFDM baseband receiver has been sampled into a plurality of samples, and the received signal comprises a short preamble, a long preamble, a signal symbol, and a plurality of data symbols, wherein the long preamble is composed of a guard interval and a first and second long training symbol (LTS), the circuit comprising:

a matched filter, for correlating the samples with an impulse response of an ideal long training symbol to generate a plurality of correlation peaks;

an enable circuit, for generating a first trigger signal when detecting an end point of the short preamble;

a peak search circuit, coupled to the enable circuit and the matched filter, for searching the correlation peaks generated from the samples of the first long training symbol for a first maximal peak point where its correlation peak has a first maximal intensity and obtaining a first time index of the first maximal peak point once receiving the first trigger signal, and generating a second trigger signal at a first peak time index;

a shift register, coupled to the matched filter, for storing the correlation peaks occurring before the first maximal peak point;

a pre-peak search circuit, coupled to the shift register and the peak search circuit, for searching the correlation peaks stored in the shift register for a pre-peak point where the correlation peak forming a pre-peak appearing before and nearest to the first maximal peak point, and obtaining a second time index of the pre-peak point once receiving the second trigger signal; and a symbol timing calculator, coupled to the peak search circuit and the pre-peak search circuit, for estimating a third time index of a start point of the second long training symbol according to the first and second time indexes, wherein a fast Fourier transformation (FFT) of the samples can be initiated at the third time index to achieve fine timing synchronization.

9. The synchronization circuit according to claim 8, wherein the matched filter comprises:

a delay line, consisting of 64 delay blocks connected in series, wherein each delay block holds a sample for a sampling period and then updates its content with a next sample;

a plurality of real and imaginary part blocks, each real and imaginary block coupled to a delay block among the 64 delay blocks, for retrieving a real part and a imaginary part of the sample stored in the delay block;

a plurality of correlation blocks, each correlation block coupled to a real and imaginary block, for multiplying the sample stored in the real and imaginary block by a matched filter coefficient reflecting an impulse response of an ideal long training symbol to generate a correlation product;

a first adder, coupled to the plurality of correlation blocks, for accumulating all of the real parts of the correlation products generated from the plurality of correlation blocks as I';

a second adder, coupled to the plurality of correlation blocks, for accumulating all of the imaginary parts of the correlation products generated from the plurality of correlation blocks as Q'; and an absolute block, coupled to the first and second adders, for computing the root-mean-square value of I' and Q' to produce a correlation peak as an output of the matched filter.

10. The synchronization circuit according to claim 8, wherein the symbol timing calculator can estimate a fourth time index of a second maximal peak point where its correlation peak has a second maximal intensity among the correlation peaks generated from the samples of the second long training symbol according to the third time index, and if an intensity of a correlation peak at the fourth time index approximates the second maximal intensity among the correlation peaks generated from the samples of the second long training symbol, the synchronization circuit confirms a success of the fine timing synchronization.

11. The synchronization circuit according to claim 8, wherein the peak search circuit identifies a current correlation peak among the correlation peaks in a search range as the first maximal peak point if an intensity of the current correlation peak is larger than a predetermined peak threshold and larger than a maximal peak record storing a maximal intensity of the correlation peaks before the current correlation peaks.

12. The synchronization circuit according to claim 11, wherein the symbol timing calculator estimates the third time index according to the following algorithm:

ST_idx=32−(Search_range−peak_idx)−(prepeak_idx+ st_shift);

wherein

ST_idx is the third time index of the start point of the second long training symbol with the origin at a time index of an end of the search range and, Search_range is a time interval of the search range which starts from the end point of the short preamble, peak_idx is a time interval between the end point of the short preamble and the first time index of the first maximal peak point, prepeak_idx is a time interval between the second time index of the pre-peak point and the first time index of the first maximal peak point, and St_shift is a shift interval.

13. The synchronization circuit according to claim 10, wherein the symbol timing calculator estimates the fourth time index by adding 32 sampling periods to the third time index to obtain the fourth time index.

14. The synchronization circuit according to claim 8, wherein the symbol timing calculator includes an up-counter for incrementing its content by one every time the synchronization circuit receives a sample to count the time elapsed.

15. A method for fine timing synchronization in wireless system using an orthogonal frequency division multiplexing (OFDM) baseband receiver, wherein a received signal of the OFDM baseband receiver has been sampled into a plurality of samples, and the received signal comprises a short preamble, a long preamble, a signal symbol, and a plurality of data symbols, wherein the long preamble is composed of a guard interval and a first long training symbol (LTS) and a second long training symbol (LTS), the method comprising the steps of:

detecting an end point of the short preamble;

delivering the samples after the end point to a matched filter which correlates the samples with an impulse response of an ideal long training symbol to generate a plurality of correlation peaks;

searching the correlation peaks generated from the samples of the first long training symbol for a first maximal peak point where its correlation peak has a first maximal intensity, and obtaining a first time index of the first maximal peak point;

storing the correlation peaks which are generated from the samples of the first long training symbol and occur before the first maximal peak point into a shift register;

searching the correlation peaks stored in the shift register for a pre-peak point where its correlation peak forms a pre-peak appearing before and nearest from the first maximal peak point, and obtaining a second time index of the pre-peak point; and estimating a third time index of a start point of the second long training symbol according to the first and second time indexes;

wherein the samples since the third time index are fed to a fast Fourier transform (FFT) block to perform FFT for channel estimation, so as to achieve fine timing synchronization.

16. A synchronization circuit for fine timing synchronization in a wireless system using an orthogonal frequency division multiplexing (OFDM) baseband receiver, wherein a received signal of the OFDM baseband receiver has been sampled into a plurality of samples, and the received signal comprises a short preamble, a long preamble, a signal symbol, and a plurality of data symbols, wherein the long preamble is composed of a guard interval and a first and second long training symbol (LTS), the circuit comprising:

a matched filter, for correlating the samples with an impulse response of an ideal long training symbol to generate a plurality of correlation peaks;

an enable circuit, for generating a first trigger signal when detecting an end point of the short preamble;

a peak search circuit, coupled to the enable circuit and the matched filter, for searching the correlation peaks generated from the samples of the first long training symbol for a first maximal peak point where its correlation peak has a first maximal intensity and obtaining a first time index of the first maximal peak point once receiving the first trigger signal, and generating a second trigger signal at a first peak time index;

a shift register, coupled to the matched filter, for storing the correlation peaks occurring before the first maximal peak point;

a pre-peak search circuit, coupled to the shift register and the peak search circuit, for searching the correlation peaks stored in the shift register for a pre-peak point where the correlation peak forming a pre-peak appearing before and nearest to the first maximal peak point, and obtaining a second time index of the pre-peak point once receiving the second trigger signal; and a symbol timing calculator, coupled to the peak search circuit and the pre-peak search circuit, for estimating a third time index of a start point of the second long training symbol according to the first and second time indexes, wherein a fast Fourier transformation (FFT) of the samples can be initiated at the third time index to achieve fine timing synchronization.

* * * * *

UNITED STATES PATENT AND TRADEMARK OFFICE
CERTIFICATE OF CORRECTION

PATENT NO. : 7,639,748 B2  Page 1 of 1
APPLICATION NO. : 11/215216
DATED : December 29, 2009
INVENTOR(S) : Kai-Pon Kao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this

Twenty-first Day of December, 2010

David J. Kappos
*Director of the United States Patent and Trademark Office*